United States Patent [19]
Kojima

[11] Patent Number: 5,839,720
[45] Date of Patent: Nov. 24, 1998

[54] VIBRATION ISOLATING APPARATUS

[75] Inventor: Hiroshi Kojima, Yokohama, Japan

[73] Assignee: Bridgestone Corporation, Tokyo, Japan

[21] Appl. No.: 680,848

[22] Filed: Jul. 16, 1996

[30] Foreign Application Priority Data

Jul. 19, 1995 [JP] Japan ................................. 7-183059

[51] Int. Cl.⁶ .............................. F16F 13/26; F16F 13/00; B60K 5/12
[52] U.S. Cl. ........................ 267/140.14; 267/219; 267/35
[58] Field of Search ........................ 267/140.14, 140.13, 267/140.11, 219, 220, 140.15, 35; 180/300, 312, 902; 248/562, 636, 550

[56] References Cited

U.S. PATENT DOCUMENTS

| | | | |
|---|---|---|---|
| 4,651,980 | 3/1987 | Morita et al. | 267/140.13 |
| 4,657,232 | 4/1987 | West . | |
| 4,720,084 | 1/1988 | Hollerweger et al. | 267/140.13 |
| 4,828,234 | 5/1989 | Hoying et al. . | |
| 4,886,251 | 12/1989 | Haussermann | 267/140.13 |
| 4,886,252 | 12/1989 | Haussermann | 267/140.13 |
| 4,925,162 | 5/1990 | Kojima | 267/140.13 |
| 5,114,124 | 5/1992 | Muramatsu . | |
| 5,167,403 | 12/1992 | Muramatsu et al. | 267/219 |
| 5,170,998 | 12/1992 | Muramatsu | 248/636 |
| 5,205,546 | 4/1993 | Schisler et al. . | |
| 5,215,293 | 6/1993 | Muramatsu et al. | 267/35 |
| 5,217,211 | 6/1993 | Ide et al. | 248/562 |
| 5,246,212 | 9/1993 | Funahashi et al. . | |
| 5,267,726 | 12/1993 | Takeo et al. | 267/35 |
| 5,370,375 | 12/1994 | Kojima | 248/562 |
| 5,386,977 | 2/1995 | Quast . | |

FOREIGN PATENT DOCUMENTS

| | | |
|---|---|---|
| A-0-262-544 | 4/1988 | European Pat. Off. . |
| A-0 440 260 | 8/1991 | European Pat. Off. . |
| A-0-690-244 | 1/1996 | European Pat. Off. . |
| A-42-09-735 | 10/1992 | Germany . |
| C-42-38-752 | 5/1994 | Germany . |
| 1-12153 | 1/1989 | Japan ................................. 267/140.13 |
| A-5-60171 | 3/1993 | Japan . |
| 6129472 | 5/1994 | Japan ................................. 267/140.13 |

OTHER PUBLICATIONS

Patent Abstracts of Japan, for JP–A–5–60171, vol. 017, No. 374 (M–1445), "Vibration Isolator", Jul. 14, 1993.
Patent Abstracts of Japan, for JP–A–4–316736, vol. 017, No. 139, (M–1385), Takao Shigeki et al., Mar. 22, 1993.

Primary Examiner—Douglas C. Butler
Attorney, Agent, or Firm—Oliff & Berridge, PLC

[57] ABSTRACT

A vibration isolating apparatus is provided which absorbs vibration over a wide frequency range. A main fluid chamber and a first sub-fluid chamber are separated from each other by a partitioning member and communicates with each other by a first restricting passage. The main fluid chamber and a second sub-fluid chamber communicate with each other by a second restricting passage. A concave portion is formed in the partitioning member and an elastic-membrane fixing pipe is inserted in and fixed to the concave portion. An outer periphery of an elastic membrane is adhered by vulcanization to an inner peripheral surface of the elastic-membrane fixing pipe. The space between the elastic membrane and the bottom of the concave portion is a gas chamber. When high frequency vibration is generated, the elastic membrane and the gas chamber function as an air spring, thereby making it possible to prevent a rise in the dynamic spring constant which is caused by an increase of internal pressure within the main fluid chamber.

15 Claims, 6 Drawing Sheets

RELATED ART

FIG. 6
RELATED ART

VIBRATION ISOLATING APPARATUS

BACKGROUND OF THE INVENTION

1. Field of the Invention

The present invention relates to a vibration isolating apparatus which is used in a vehicle, an ordinary industrial machine or the like, and which absorbs and damps vibration from a vibration generating portion.

2. Description of the Related Art

A vibration isolating apparatus serving as an engine mount is disposed between the engine and the vehicle body of an automobile, and prevents the transmission of the engine vibration to the vehicle body.

Types of vibrations generated at the engine include so-called shake vibration which is generated when the vehicle is traveling at high speeds or the like, and so-called idle vibration which is generated when the vehicle is idling or is traveling at speeds of around 5 km/h. The respective frequencies of shake vibration and idle vibration are different; generally, the frequency of shake vibration is less than 15 Hz, whereas the frequency of idle vibration is 20 to 50 Hz.

A fluid-filled vibration isolating apparatus, in which a main fluid chamber and a sub-fluid chamber are connected to each other by an orifice and vibration is reduced by a damping function due to the flow of fluid within the orifice, has been proposed as a vibration isolating apparatus which absorbs and reduces shake vibration and idle vibration. There has been conventionally used a moving piece, a membrane, or the like, as a structure for preventing an increase in internal pressure of the main fluid chamber in the above-described vibration isolating apparatus.

Figure 5:
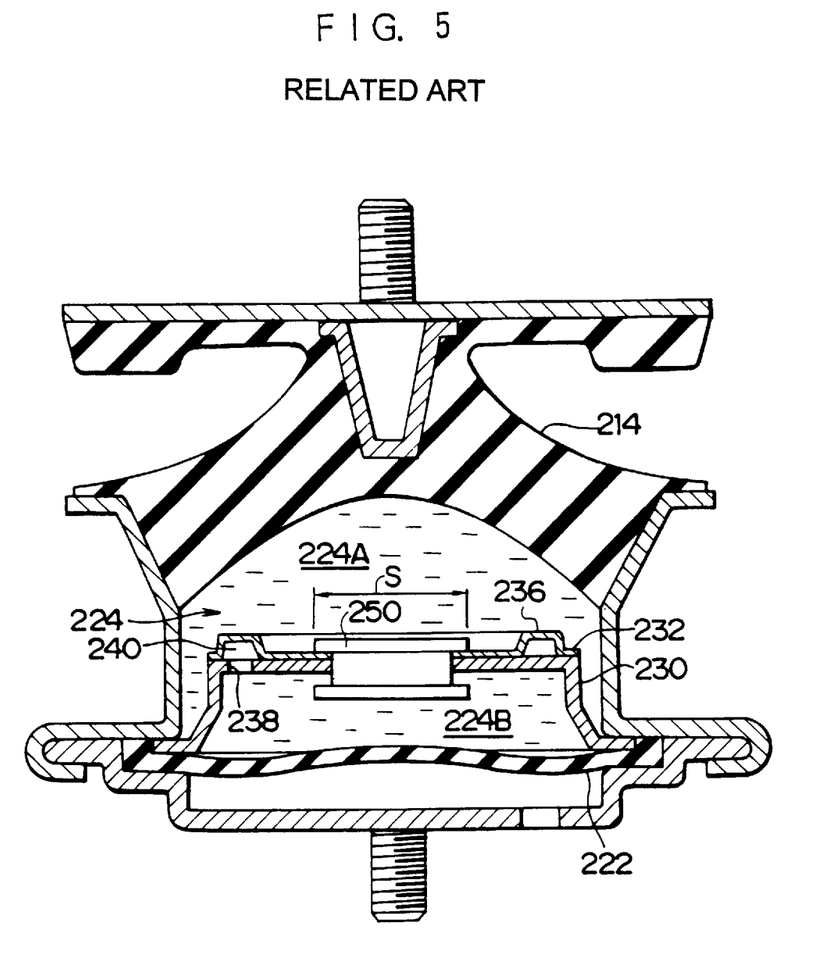
FIG. 5 is a cross-sectional view of one example of a conventional vibration isolating apparatus.

As an example of such a vibration isolating apparatus, the structure as shown in FIG. 5 has been known. In this vibration isolating apparatus, a fluid chamber 224 is located between a rubber 214 and a diaphragm 222 and a cylindrical partitioning wall 230 for dividing the fluid chamber 224 into a main fluid chamber 224A and a sub-fluid chamber 224B is provided within the fluid chamber 224. A circular plate 232 is disposed on the surface of the cylindrical partitioning wall 230 in such a manner that an orifice space 240 serving as a fluid passage is formed therebetween. Through holes 236, 238 are respectively formed at both ends of the orifice space 240 to allow communication between these fluid chambers 224A, 224B, and vibration is absorbed and reduced in such a manner that fluid moves reciprocatively within the main fluid chamber 224A and the sub-fluid chamber 224B via the through holes 236, 238.

In addition, a moving piece 250 is mounted between the cylindrical partitioning wall 230 and the circular plate 232 in this vibration isolating apparatus. Accordingly, not only vibration is reduced by the above-described orifice space 240, but also vibration of a higher frequency can be absorbed by very little vibration of the moving piece 250.

Figure 6:
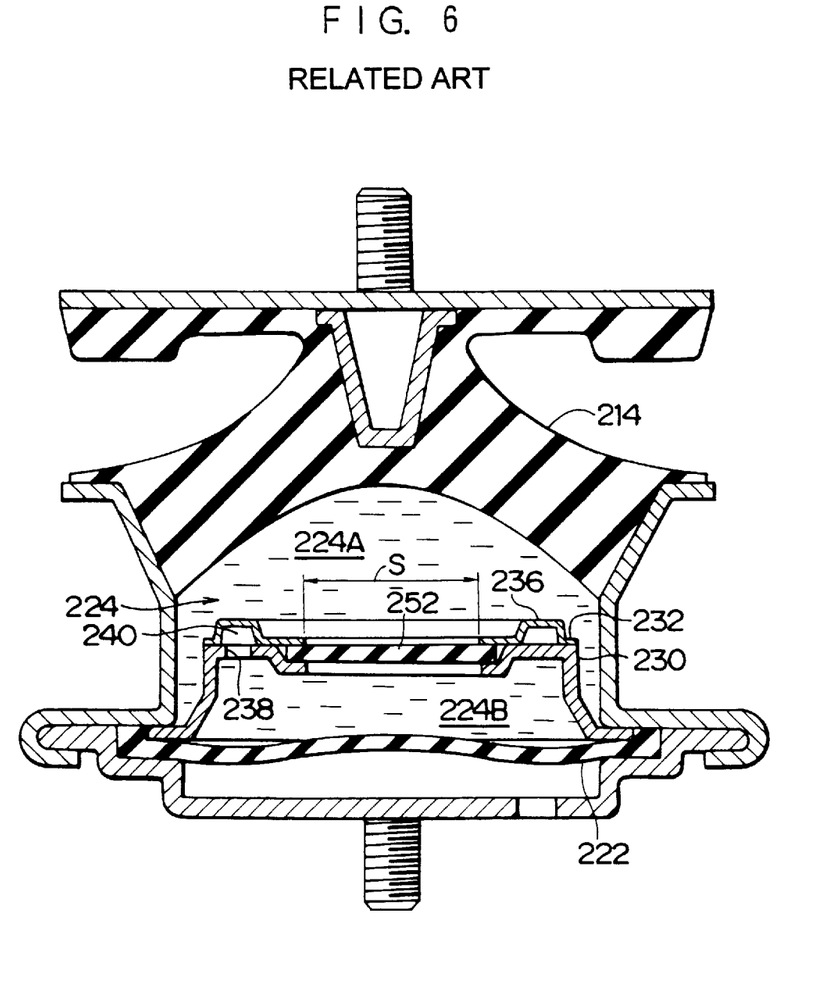
FIG. 6 is a cross-sectional view of another example of a conventional vibration isolating apparatus.

On the other hand, as another example of the vibration isolating apparatus, the structure as shown in FIG. 6 has been known. This vibration isolating apparatus has substantially the same structure as that of the vibration isolating apparatus shown in FIG. 5, and a membrane 252 made of rubber is provided in place of the moving piece 250.

Here, the moving portion such as the moving piece 250 or the membrane 252 operates in the same way as an orifice and a dynamic spring constant once decreases due to the fluid located on an area S of the moving portion. However, the dynamic spring constant increases for vibration of a higher frequency.

Accordingly, in this case, it is necessary to prevent increase in force for expanding the main fluid chamber 224A, which is caused by an increase in internal pressure of the main fluid chamber 224A, without using the generally-known fluid-column resonance.

Namely, when the conventional moving piece or membrane is used, the dynamic spring constant can be partially decreased in a particular frequency range, but clogging occurs in a higher frequency range so that the dynamic spring constant increases. As a result, the dynamic spring constant cannot be decreased over a wide frequency range. For this reason, when it is necessary to uniformly decrease the dynamic spring constant over the wide frequency range, the moving piece or the membrane is not sufficient.

Particularly, when a spreader spring for increasing the internal pressure of the main fluid chamber is large, the fluid resonates preferably when the fluid-column resonance is generated, and on the other hand, the antiresonance also becomes larger in a higher frequency range and the dynamic spring constant may be increased still further by the antiresonance.

SUMMARY OF THE INVENTION

In view of the above-described circumstances, it is an object of the present invention to provide a vibration isolating apparatus which can absorb vibration over a wide frequency range.

In accordance with the present invention, there is provided a vibration isolating apparatus which comprises: a first mounting member connected to one of a vibration generating portion and a vibration receiving portion; a second mounting member connected to the other of the vibration generating portion and the vibration receiving portion; an elastic body which is provided between said first mounting member and said second mounting member and deforms when vibration is generated; a main fluid chamber which is formed so as to be expandable and contractible with said elastic body serving as a portion of a partition wall of said main fluid chamber and which is filled with fluid; a deformable elastic membrane forming a portion of the partition wall of said main fluid chamber; a gas chamber which is disposed opposite to said main fluid chamber with said elastic membrane interposed therebetween and which is filled with gas and hermetically sealed; a sub-fluid chamber communicating with said main fluid chamber via a restricting passage; a deformable diaphragm forming a portion of a partition wall of said sub-fluid chamber; an air chamber which is disposed opposite to said sub-fluid chamber with said diaphragm interposed therebetween and which is filled with gas; and a switching valve which can be set in an open state in which said air chamber communicates with an outside air or in a closed state in which communication between said air chamber and the outside air is not allowed.

The vibration from the vibration generating portion is transmitted to the elastic body via the first mounting member or the second mounting member. At this time, the vibration is absorbed by resistance based on the internal friction of the elastic body and is also absorbed by passage resistance or the fluid-column resonance of the fluid passing through the restricting passage due to expansion and contraction of the main fluid chamber of which partition wall is partly formed from the elastic body.

When vibration of a high frequency which cannot be absorbed by the restricting passage is generated, the switching valve is set in a closed state and a relatively high frequency vibration is absorbed.

When a higher frequency vibration is generated, the elastic membrane forming a portion of the partition wall of the main fluid chamber, and the gas chamber which is disposed opposite to the main fluid chamber with the elastic membrane interposed therebetween and which is filled with gas, function as an air spring. This makes it possible to prevent a rise in the dynamic spring constant which is caused by the increase in the internal pressure of the main fluid chamber, i.e., the increase in the fluid pressure within the main fluid chamber.

For example, by providing the elastic membrane and the gas chamber in a portion of the elastic body which is formed as the partition wall of the main fluid chamber, or in the partitioning member for separating the main fluid chamber and the sub-fluid chamber from each other, the elastic membrane deforms and absorbs an amount by which the internal pressure of the main fluid chamber increases. This makes it possible to decrease the dynamic spring constant in the high frequency range. Moreover, since the air spring is provided which is formed by the elastic membrane and the gas chamber, the fluid-column resonance is difficult to be generated and there is no possibility of the dynamic spring constant increasing due to the antiresonance.

As a result, the dynamic spring constant would not increase even in the high frequency range and becomes uniform over an entire frequency range to be used, and vibration thereby can be absorbed over the wide frequency range.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENTS

Figure 1:
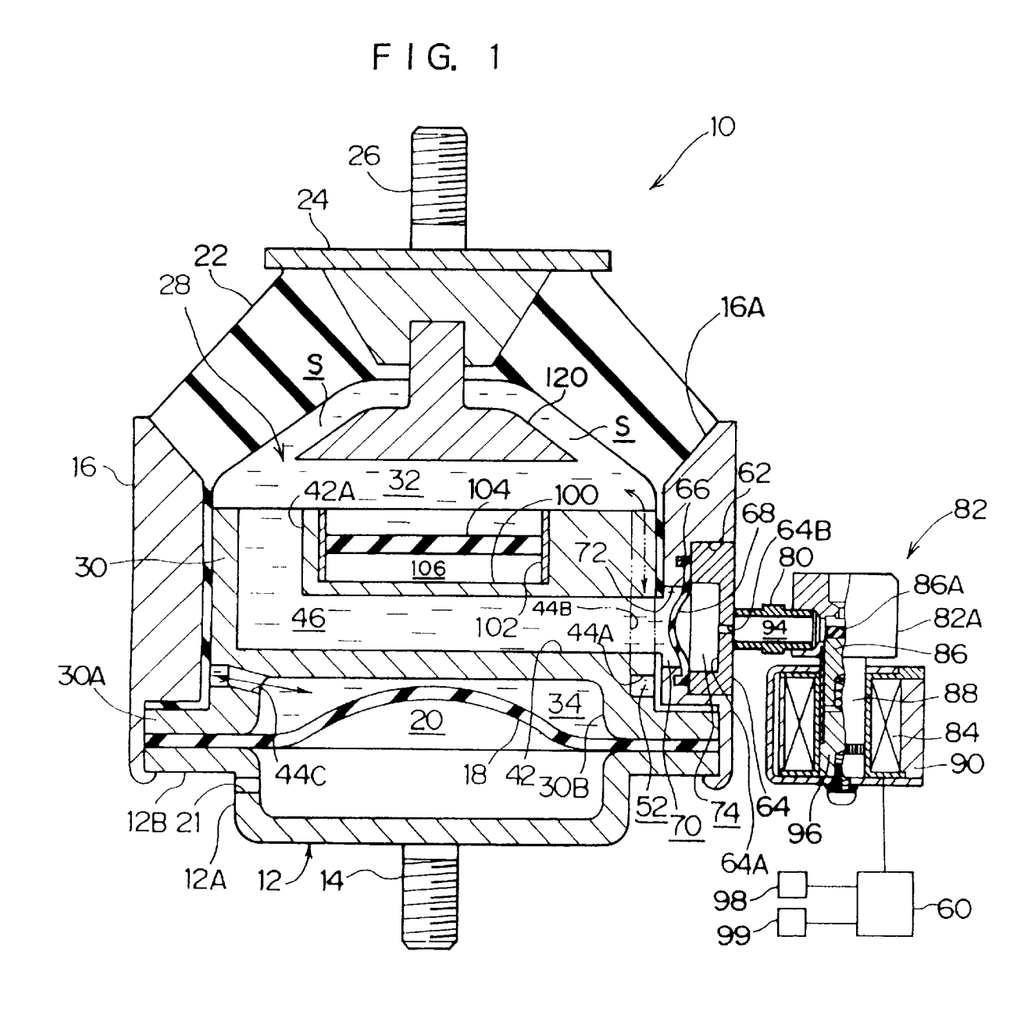
FIG. 1 is a cross-sectional view of a vibration isolating apparatus according to a first embodiment of the present invention.
Figure 2:
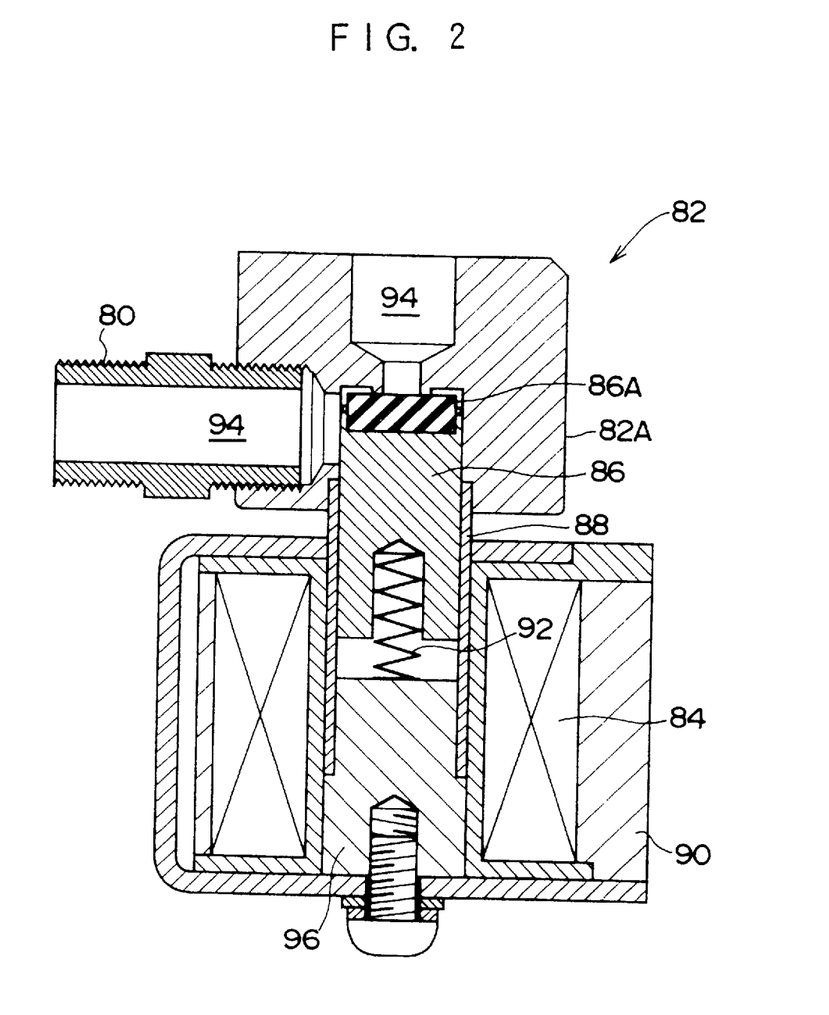
FIG. 2 is an enlarged cross-sectional view of a switching valve used in the vibration isolating apparatus of the first embodiment and shows a closed state of the switching valve.
Figure 3:
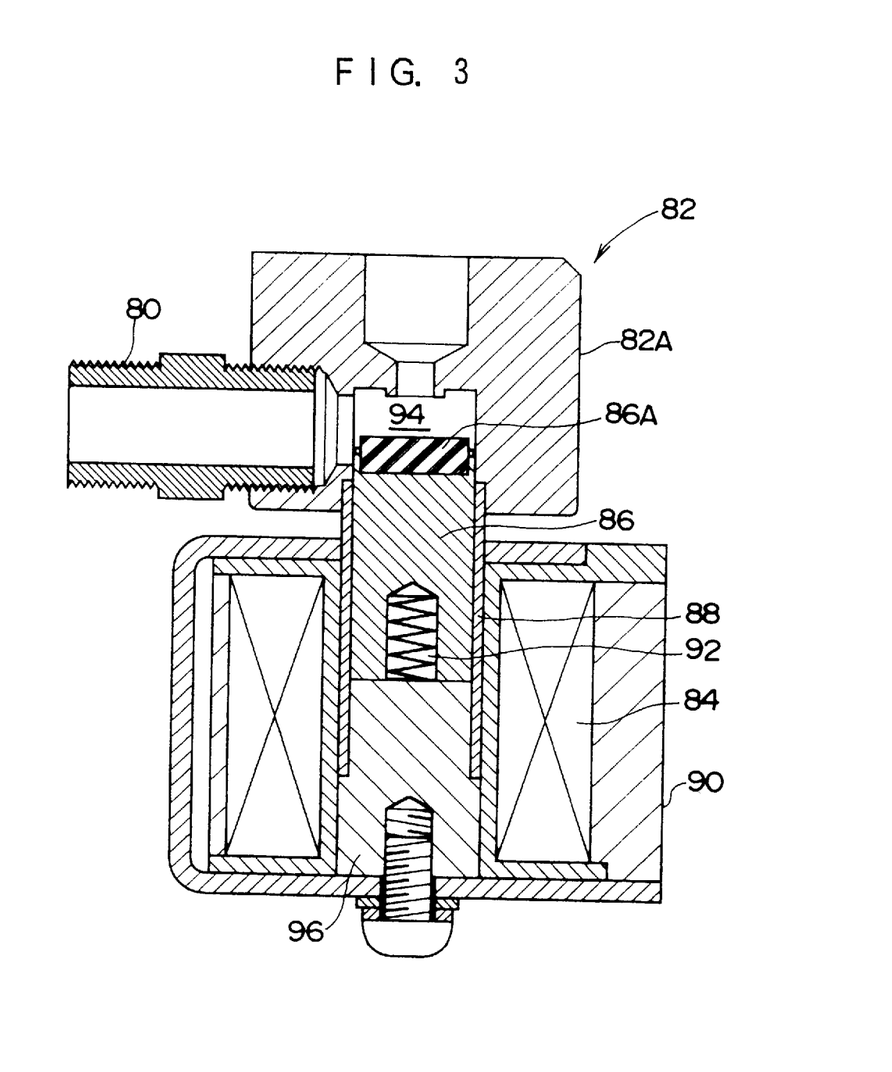
FIG. 3 is an enlarged cross-sectional view of a switching valve used in the vibration isolating apparatus of the first embodiment and shows an open state of the switching valve.

Referring now to FIGS. 1 through 3, a description will be given of a vibration isolating apparatus according to a first embodiment of the present invention.

As shown in FIG. 1, a vibration isolating apparatus 10 of the first embodiment includes a bottom plate 12 serving as a first mounting member. A mounting bolt 14 protrudes from a central lower portion of the bottom plate 12 and the vibration isolating apparatus 10 is fixed to, for example, an unillustrated vehicle body by using the mounting bolt 14. A tubular standing wall portion 12A is formed on the periphery of the bottom plate 12 in such a manner as to be bent perpendicular to the bottom plate 12. A flange portion 12B bent perpendicular to the standing wall portion 12A is formed continuously from the upper end portion of the standing wall portion 12A.

An outer cylinder 16, which is formed in the shape of a thick-walled cylinder and of which lower portion is partially in a thin-walled state, is disposed above the bottom plate 12. Further, the peripheral edge portion of a first diaphragm 18 is held between the flange portion 12B of the bottom plate 12 and the lower end of the thick-walled portion of the outer cylinder 16 and the small-diameter portion of the outer cylinder 16 is fixed by caulking to the flange portion 12B of the bottom plate 12.

The space between the first diaphragm 18 and the bottom plate 12 is a first air chamber 20 and the first air chamber 20 communicates with the exterior via an air hole 21 formed in the standing wall portion 12A.

The upper end portion of the inner peripheral surface of the outer cylinder 16 is an enlarged opening portion 16A of which inner diameter is enlarged. The outer periphery of an elastic body 22 is adhered by vulcanization to the enlarged opening portion 16A to close the opening portion of the outer cylinder 16. Further, a portion of the elastic body 22 extends to the lower end of the inner periphery of the outer cylinder 16 and the outer peripheral side of the elastic body 22 is adhered by vulcanization to the outer cylinder 16.

A supporting stand 24 serving as a second mounting member is adhered by vulcanization to the center of the elastic body 22. The supporting stand 24 is a portion on which an unillustrated engine is loaded, and a mounting bolt 26 for fixing the engine is provided upright from the supporting stand 24.

A fluid chamber 28 is formed by the inner peripheral portion of the outer cylinder 16, the lower end portion of the elastic body 22, the first diaphragm 18 and the like, and fluid such as ethylene glycol or the like is filled in the fluid chamber 28.

A column-shaped partitioning member 30 made of synthetic resin or the like is disposed within the fluid chamber 28 and a flange portion 30A is provided in the lower portion of the partitioning member 30 so as to project toward the outer peripheral side of the partitioning member 30. The flange portion 30A is held between the peripheral edge portion of the first diaphragm 18 and the lower end of the thick-walled portion of the outer cylinder 16.

For this reason, the partitioning member 30 is used to divide the fluid chamber 28 into a main fluid chamber 32 and first sub-fluid chamber 34. A concave portion 30B is formed at the first sub-fluid chamber 34 side of the partitioning member 30.

A resistance piece 120 whose lower portion becomes thin gradually toward its peripheral edge is disposed within the main fluid chamber 32. The resistance piece 120 is fixed within the main fluid chamber 32 with the proximal end side thereof being supported by the supporting stand 24. Synchronously with the deformation of the elastic body 22, the fluid can flow through a clearance S between the elastic body 22 and the outer peripheral surface of the resistance piece 120 at the one end side thereof.

A thin groove 44A having a rectangular cross section is formed in the outer periphery of the partitioning member 30 along the circumferential direction thereof. A thin groove 44B is connected to one end of the thin groove 44A and extends to the upper surface of the partitioning member 30. An opening portion 44C penetrating to the concave portion 30B is connected to another end of the thin groove 44A. The narrow grooves 44A, 44B at the side of the outer cylinder 16 are closed by an extended portion of the elastic body 22 and forms a first restricting passage 52 which allows communication between the main fluid chamber 32 and the first sub-fluid chamber 34.

Further, a rectangular hole 42 is formed in the partitioning member 30 in such a manner as to extend from the outer periphery of the partitioning member 30 toward the center thereof. As shown in FIG. 1, one end of the rectangular hole 42 bends upwardly and communicates with the main fluid chamber 32 via an opening portion 42A so as to form a second restricting passage 46.

A concave portion 62 is formed on the outer peripheral side of the outer cylinder 16 at a position corresponding to the rectangular hole 42 of the partitioning member 30 and is closed by a block 64. A through hole 72 is formed at the bottom of the concave portion 62 and communicates with the rectangular hole 42.

An annular concave portion 66 is formed at the bottom of the concave portion 62 and at the outer peripheral side of the through hole 72 and the peripheral edge portion of a second diaphragm 68 is held between the annular concave portion 66 and the block 64. The second diaphragm 68 is, in a free state, provided to protrude substantially hemispherically toward the through hole 72. The through hole 72 is closed by the second diaphragm 68 so as to form a second sub-fluid chamber 70. Further, a concave portion 64A is formed in the block 64 so as to face the second diaphragm 68. The space between the concave portion 64A and the second diaphragm 68 is a second air chamber 74. The second air chamber 74 and a connecting pipe 80 communicate with each other by a hole 64B formed in the block 64.

A main body 82A of a switching valve 82 shown in FIGS. 1 through 3 is mounted, via the connecting pipe 80, to a portion of the block 64 at the opposite side of the second diaphragm 68. A coil housing portion 90 which houses a coil 84 is connected to the main body 82A via a tube 88. A plunger 86 is movably disposed within the tube 88 and a spring 92 is disposed between the proximal end of the plunger 86 and an attraction element 96 disposed within the coil housing portion 90. A packing 86A is mounted at the distal end of the plunger 86. An L-shaped passage 94 penetrating through the block 64, the connecting pipe 80 and the main body 82A of the switching valve 82 to allow communication between the second air chamber 74 and the outside air can be closed by the packing 86A.

Accordingly, when voltage is not applied to a coil 84, as shown in FIG. 2, the plunger 86 is urged by the spring 92 and the passage 94 is closed by the packing 86A. On the other hand, when a predetermined voltage is applied to the coil 84, as shown in FIG. 3, the plunger 86 is attracted toward the attraction element 296 by the electromagnetic force generated by the coil 84. The packing 86A of the distal end of the plunger 86 moves away, and the passage 94 is opened.

The coil 84 is connected to a control circuit 60 which serves as control means for turning the applied voltage on and off. The control circuit 60 is driven by the power source of a vehicle and receives detection signals from at least a vehicle speed sensor 98 and an engine rotational frequency sensor 99 so as to detect the vehicle speed and the engine rotational frequency. In this way, the control circuit 60 can determine when the vehicle is idling or shaking, or when the vehicle is generating high-frequency vibration.

Meanwhile, the passage length of the first restricting passage 52 is longer than that of the second restricting passage 46, and the passage cross-sectional area of the first restricting passage 52 is smaller than that of the second restricting passage 46.

The respective rigidities of the first diaphragm 18 and the second diaphragm 68 are different and the rigidity of the second diaphragm 68 is higher than that of the first diaphragm 18.

The fluid-column resonance frequencies in the restricting passages are determined by the sizes of the restricting passages and the rigidities of the diaphragms. The fluid-column resonance frequency in the second restricting passage 46 can be changed by varying the value of the rigidity of the second diaphragm 68.

A concave portion 100 is formed in the partitioning member 30 at the center of the main fluid chamber 32 side and an elastic-membrane fixing pipe 102 is inserted into and fixed to the concave portion 100.

The outer periphery of a circular-plate-shaped elastic membrane 104 made of rubber is adhered by vulcanization to the axial-direction intermediate portion on the inner peripheral surface of the elastic-membrane fixing pipe 102 and the space between the elastic membrane 104 and the bottom of the concave portion 100 is a gas chamber 106 in which air or the like is filled. Namely, the gas chamber 106 is disposed to face to the main fluid chamber 32 with the elastic membrane 104 disposed therebetween. It should be noted that the gas chamber 106 does not communicate with the outside air.

In the present embodiment, the rigidity of the elastic membrane 104 is made larger than the rigidities of the first diaphragm 18 and the second diaphragm 68.

Next, an operation of the first embodiment will be described.

When the bottom plate 12 of the vibration isolating apparatus 10 is fixed to, for example, the vehicle body of an automobile or the like and the engine is mounted on and fixed to the supporting stand 24, vibration of the engine is transmitted to the elastic body 22 via the supporting stand 24 and is absorbed by resistance based on the internal friction of the elastic body 22.

When the vehicle is traveling at, for example, 70–80 km/h, shake vibration (e.g., vibration of a frequency less than 15 Hz) is generated. At this time, the elastic membrane 104 deforms in a nonlinear manner, and at the same time, the fluid moves reciprocally between the main fluid chamber 32 and the first sub-fluid chamber 34 through the first restricting passage 52. Damping force is generated by resistance at the time when the fluid passes through the first restricting passage 52, and the shake vibration is effectively absorbed. When shake vibration is generated, the second diaphragm 68 having high rigidity hardly deforms at all, and there is hardly any flow of the fluid through the second restricting passage 46.

When the engine is idling or the vehicle speed is 5 km/h or less, idle vibration (e.g., vibration of a frequency of 20 to 50 Hz) is generated.

When idle vibration is generated, the first restricting passage 52 becomes clogged. For this reason, the fluid moves reciprocally between the main fluid chamber 32 and the second sub-fluid chamber 70 through the second restricting passage 46, and fluid-column resonance is generated in the second restricting passage 46. When idle vibration is generated, the fluid flows through the second restricting passage 46. Therefore, the elastic membrane 104 is hard to deform.

At this time, the control circuit 60 determines from the vehicle speed sensor 98 and the engine rotational frequency sensor 99 whether the frequency of the vibration is on the low end or the high end of idle vibration. When the control circuit 60 determines that the frequency of the vibration is on the low end, the control circuit 60 applies voltage to the coil 84 of the switching valve 82, and the plunger 86 is attracted. The plunger 86 thereby moves apart from the inner wall surface of the main body 82A, and the second air chamber 74 is set in an open state in which it is open to the outside air via the passage 94. As a result, the rigidity of the second diaphragm 68 is low as compared to a case in which the second air chamber 74 is closed. The dynamic spring constant of the vibration isolating apparatus 10 in the frequency range of low-frequency idle vibration decreases, and the low-frequency idle vibration is reliably absorbed.

On the other hand, when it is determined that the frequency of the vibration is on the high end of idle vibration, the control circuit 60 stops application of voltage to the coil 84. As a result, the plunger 86 is urged by the spring 92 and abuts against the inner wall surface of the main body 82A to close the passage 94. Thus, the second air chamber 74 is set in a closed state in which the space between the second air chamber 74 and the outside air is closed. For this reason, the rigidity of the second diaphragm 68 increases, and the fluid-column resonance frequency in the second restricting passage 46 thereby moves toward the high frequency side. The dynamic spring constant of the vibration isolating apparatus 10 in the frequency region of high-frequency idle vibration decreases, and the high-frequency idle vibration is reliably absorbed.

As described above, in the vibration isolating apparatus 10 of the present embodiment, both low-frequency idle vibration and high-frequency idle vibration can be addressed with the second air chamber 74 being open or not being open to the outside air by using the switching valve 82.

Further, at vehicle speeds of 100 km/h or more or when the engine rotational frequency is 3,000 rpm or more or in other such cases, high frequency vibration which causes shaking sound (e.g., vibration whose frequency is in the vicinity of 50 to 300 Hz) is generated.

In this case, although the second restricting passage 46 becomes clogged, the elastic membrane 104 deforms and a rise in pressure of the fluid within the main fluid chamber 32 is suppressed. Therefore, a rise in the dynamic spring constant is suppressed, and the dynamic spring constant of the frequency region of vibration at the time when the rotational frequency of the engine is high decreases. Thus, high-frequency vibration can be reliably absorbed.

When high-frequency vibration whose frequency is in the vicinity of 50 to 300 Hz is generated, the elastic membrane 104 which forms a portion of the partitioning wall of the main fluid chamber 32, and the gas chamber 106, which is disposed opposite to the main fluid chamber 32 with the elastic membrane 104 provided therebetween and is filled with air, functions as an air spring, and a rise in the dynamic spring constant due to an increase in internal pressure of the main fluid chamber 32 can be prevented.

Moreover, the vibration of still higher frequencies in the vicinity of 300 to 500 Hz can be reduced by resistance at the time of the fluid passing through the clearance S between the elastic body 22 and the outer peripheral surface of the resistance piece 120 disposed in the main fluid chamber 32 at the lead end portion of the resistance piece 120.

As a result, there is no possibility of the dynamic spring constant increasing in the high frequency range, and the dynamic spring constant is uniformed over the entire frequency range of vibration to be used. Therefore, it becomes possible to absorb vibration over a wide frequency range.

Namely, when the fluid pressure of the main fluid chamber 32 at the time of the vibration in a low-frequency range, generally having a large amplitude, increases, great deformation of the elastic membrane 104 can be prevented by the nonlinear deformation of the elastic membrane 104 and the air spring within the gas chamber 106. For this reason, when a large-amplitude vibration in the low-frequency range is generated, the internal pressure of the main fluid chamber 32 is not absorbed and the damping ability does not deteriorate.

Further, when vibration in a high-frequency range is generated, an increase in internal pressure of the main fluid chamber 32 is absorbed by the gas chamber 106, and at the same time, the elastic membrane 104 deforms linearly. As a result, a rise in the dynamic spring constant which is caused by an increase in the internal pressure of the fluid chamber can be suppressed.

Namely, the spreader spring of the vibration isolating apparatus 10 is determined by the diameter size (i.e., effective diameter) by which the deformation of the elastic body 22 of the vibration isolating apparatus 10 can effectively act on the main fluid chamber 32, and by the force of the elastic body 22 to push away the fluid within the main fluid chamber 32. By enlarging the spreader spring, damping efficiency of the shake vibration can be increased and the fluid-column resonance for the idle vibration can be generated more clearly so as to decrease the dynamic spring constant. On the other hand, there is a possibility that the dynamic spring constant increases for the vibration of a higher frequency range. Accordingly, low-frequency vibration such as shake vibration, idle vibration or the like, and high-frequency vibration cannot be simultaneously addressed by the conventional apparatus.

However, in the present embodiment, by enlarging the spreader spring and by decreasing the dynamic spring constant in a high-frequency vibration with the elastic membrane 104 and the gas chamber 106 being provided, it is possible to both maintain the damping characteristics in a low-frequency vibration and reduce the dynamic spring constant in the high-frequency vibration.

Figure 4:
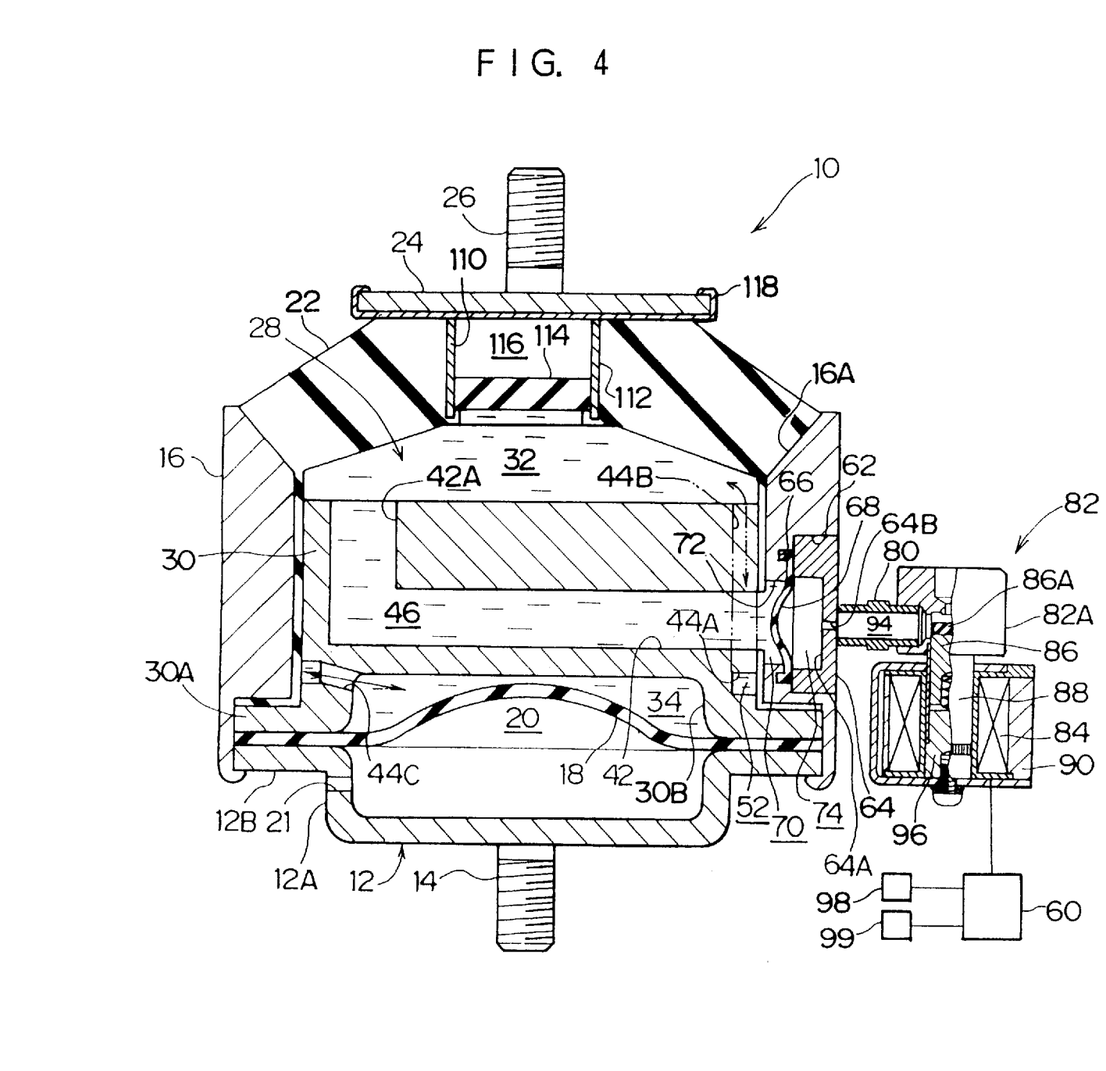
FIG. 4 is a cross-sectional view of a vibration isolating apparatus according to a second embodiment of the present invention.

Referring now to FIG. 4, a description will be given of a vibration isolating apparatus according to a second embodiment of the present invention. It should be noted that the same members as those of the first embodiment will be denoted by the same reference numerals, and a description thereof will be omitted.

As shown in FIG. 4, in the second embodiment, the partitioning member 30 of the vibration isolating apparatus 10 does not include the elastic membrane 104 and the gas chamber 106, but a hole portion 110 is formed in the central portion of the elastic body 22. An elastic-membrane fixing pipe 112 is inserted into and fixed to the hole portion 110 and the upper end of the elastic-membrane fixing pipe 112 is connected by welding or the like to a connecting plate 118 secured to the supporting stand 24.

The outer periphery of an elastic membrane 114 formed in the shape of a circular plate and made of rubber is adhered by vulcanization to the inner peripheral surface of the elastic-membrane fixing pipe 112 at an axial-direction intermediate portion thereof. The space between the elastic membrane 114 and the bottom of the hole portion 110 is a gas chamber 116 in which air or the like is filled. The gas chamber 116 is not open to the outside air in the same manner as in the first embodiment.

Consequently, the second embodiment has the same operations as those of the first embodiment by using the elastic membrane 114 and the gas chamber 116.

Further, in the above-described preferred embodiments, structures are described in which the vibration isolating apparatus 10 is used as an engine mount. However, the present invention is not limited to the same, and the vibration isolating apparatus 10 may be used as a cab mount, a body mount, the support for an ordinary industrial machine, or the like.

As described above, the vibration isolating apparatus of the present invention has an effect in that vibration over a wide frequency range can be absorbed.

While the embodiments of the present invention, as herein disclosed, constitute a preferred form, it is to be understood that other forms might be adopted.

What is claimed is:

1. A vibration isolating apparatus, comprising:
   a first mounting member connected to one of a vibration generating portion and a vibration receiving portion;
   a second mounting member connected to the other of the vibration generating-portion and the vibration receiving portion;
   an elastic body which is provided between said first mounting member and said second mounting member and deforms when vibration is generated;
   a partitioning member mounted between the first mounting member and the second mounting member;
   a main fluid chamber which is formed so as to be expandable and contractible with said elastic body serving as a portion of a partition wall and said partitioning member providing a further portion of the partition wall of said main fluid chamber, said main fluid chamber filled with fluid;
   a deformable elastic membrane also forming a portion of the partition wall of said main fluid chamber and seated in one of the elastic body and the partitioning member;
   a gas chamber which is disposed opposite to said main fluid chamber with said elastic membrane interposed therebetween and which is filled with gas and hermetically sealed;
   a first sub-fluid chamber communicating with said main fluid chamber via a first restricting passage;
   a first deformable diaphragm forming a portion of a partition wall of said first sub-fluid chamber;
   a first air chamber which is disposed opposite to said first sub-fluid chamber with said first diaphragm interposed therebetween and which is filled with gas and hermetically sealed;
   a second sub-fluid chamber communicating with said main fluid chamber via a second restricting passage through the partitioning member;
   a second deformable diaphragm forming a portion of a partition wall of said second sub-fluid chamber;
   a second air chamber which is disposed opposite to said second sub-fluid chamber with said second diaphragm interposed therebetween and which is filled with gas; and
   a switching valve which can be set in an open state in which said second air chamber communicates with an outside air or in a closed state in which communication between said air chamber and the outside air is not allowed.

2. A vibration isolating apparatus according to claim 1, wherein said main fluid chamber and said second sub-fluid chamber are disposed within an outer cylinder fixed to said first mounting member and said outer cylinder and said second mounting member are connected by said elastic body which is made annular.

3. A vibration isolation apparatus according to claim 2, wherein said second air chamber is formed on a peripheral surface of said outer cylinder.

4. A vibration isolating apparatus according to claim 1, wherein said gas chamber is formed in said partitioning member.

5. A vibration isolating apparatus according to claim 1, wherein said gas chamber is formed in said elastic body and attached to said second mounting member.

6. A vibration isolating apparatus according to claim 1, wherein, when a relatively low frequency vibration is absorbed, said switching valve is set in an open state in which said second air chamber communicates with the outside air, and when a relatively high frequency vibration is absorbed, said switching valve is set in a closed state in which communication between said second air chamber and the outside air is not allowed.

7. A vibration isolating apparatus, comprising:
   a first mounting member connected to one of a vibration generating portion and a vibration receiving portion;
   a second mounting member connected to the other of the vibration generating portion and the vibration receiving portion;
   an outer cylinder attached to the second mounting member and extending toward the first mounting member;
   an elastic body connecting the outer cylinder and the first mounting member, the elastic body, outer cylinder and second body member defining a cavity therein;
   a partitioning member mounted in the cavity to divide the cavity into a first chamber and a second chamber;
   a first diaphragm mounted in the second chamber to divide the second chamber into a first sub-chamber and a second sub-chamber, the first chamber and the first sub-chamber containing a fluid;
   a first passage connecting the first chamber and the first sub-chamber;
   a third chamber formed in the outer cylinder;
   a second diaphragm dividing the third chamber into a third sub-chamber and a fourth sub-chamber;
   a second passage-connecting the first chamber and the third sub-chamber;
   a switching valve connected to the fourth sub-chamber to selectively connect the fourth sub-chamber to the atmosphere;
   a concave portion formed in a side of the partitioning member facing the first chamber to define a fifth sub-chamber; and
   a membrane dividing the fifth sub-chamber into a gas chamber and a fluid chamber associated with the first chamber.

8. The vibration isolating apparatus according to claim 7, further comprising a resistance piece extending from the first mounting member into the first chamber.

9. The vibration isolating apparatus according to claim 7, wherein a length of the first passage is greater than a length of the second passage.

10. The vibration isolating apparatus according to claim 7, wherein a cross-sectional area of the first passage is less than a cross-sectional area of the second passage.

11. The vibration isolating device according to claim 7, wherein a rigidity of the membrane is greater than a rigidity of the second diaphragm which in turn is greater than a rigidity of the first diaphragm.

12. A vibration isolating apparatus, comprising:

a first mounting member connected to one of a vibration generating portion and a vibration receiving portion;

a second mounting member connected to the other of the vibration generating portion and the vibration receiving portion;

an outer cylinder attached to the second mounting member and extending toward the first mounting member;

an elastic body connecting the outer cylinder and the first mounting member, the elastic body, outer cylinder and second body member defining a cavity therein;

a partitioning member mounted in the cavity to divide the cavity into a first chamber and a second chamber;

a first diaphragm mounted in the second chamber to divide the second chamber into a first sub-chamber and a second sub-chamber, the first chamber and the first sub-chamber containing a fluid;

a first passage connecting the first chamber and the first sub-chamber;

a third chamber formed in the outer cylinder;

a second diaphragm dividing the third chamber into a third sub-chamber and a fourth sub-chamber;

a second passage connecting the first chamber and the third sub-chamber;

a switching valve connected to the fourth sub-chamber to selectively connect the fourth sub-chamber to the atmosphere;

a hole portion formed in the elastic body by means of a fixing pipe attached to the first mounting member; and a membrane attached to the fixing pipe to divide the hole portion into a gas chamber and a fluid chamber associated with the first chamber.

13. The vibration isolating apparatus according to claim 12, wherein a length of the first passage is greater than a length of the second passage.

14. The vibration isolating apparatus according to claim 12, wherein a cross-sectional area of the first passage is less than a cross-sectional area of a second passage.

15. The vibration isolating device according to claim 12, wherein a rigidity of the membrane is greater than a rigidity of the second diaphragm which in turn is greater than a rigidity of the first diaphragm.

* * * * *